UNITED STATES PATENT OFFICE.

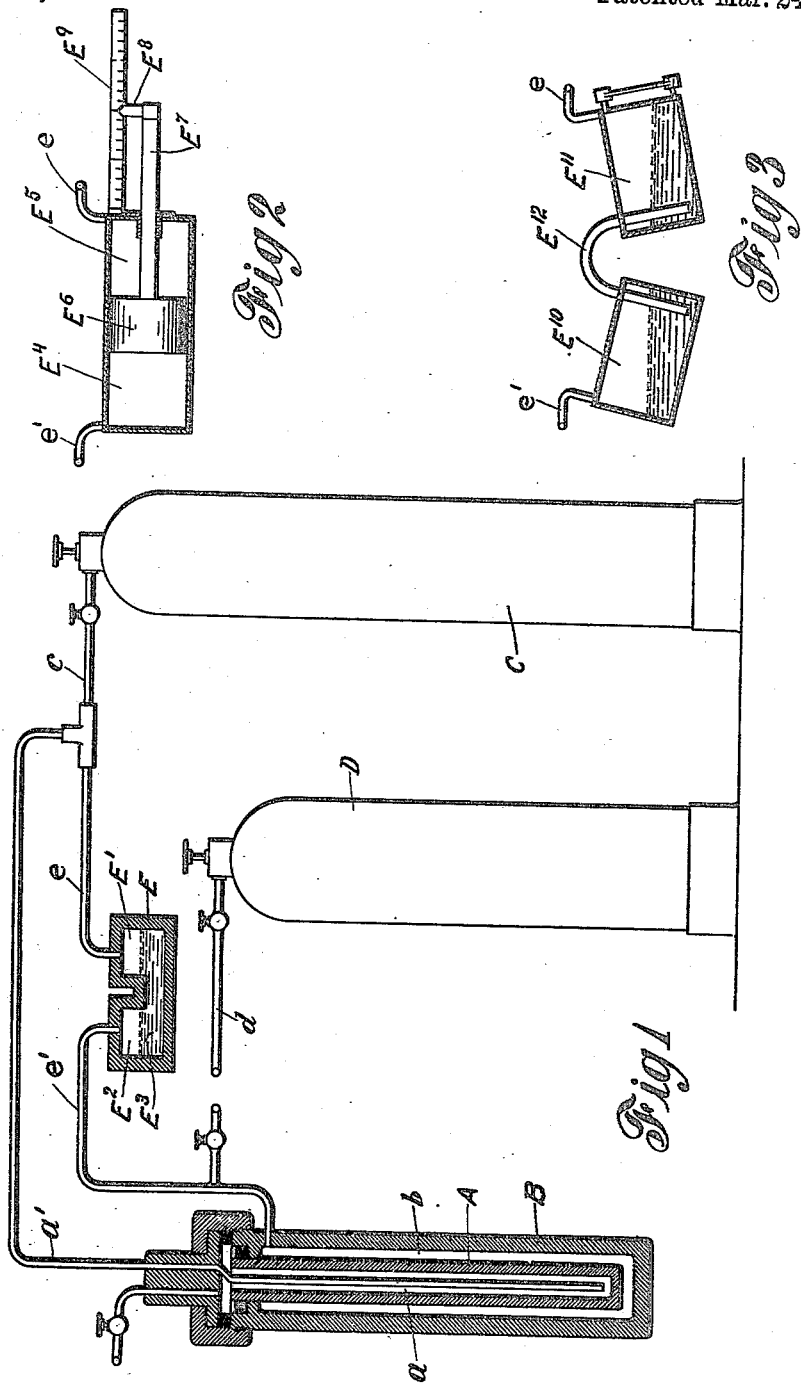

MATHIAS PIER, OF ZEHLENDORF, NEAR BERLIN, GERMANY.

PROCESS OF BRINGING HYDROGEN OR HYDROGEN-CONTAINING GAS MIXTURES TO REACTION AND APPARATUS THEREFOR.

1,090,874.    Specification of Letters Patent.    Patented Mar. 24, 1914.

Application filed June 28, 1913.    Serial No. 776,340.

*To all whom it may concern:*

Be it known that I, MATHIAS PIER, a subject of the German Emperor, residing at Zehlendorf, near Berlin, Germany, have invented a new and useful Process of Bringing Hydrogen or Hydrogen-Containing Gas Mixtures to Reaction and Apparatus Therefor; and I do hereby declare the following to be a full, clear, and exact description of the same.

Referring to the accompanying drawings, Figure 1 illustrates (partly in section) an apparatus for carrying out my new method; Figs. 2 and 3 show modifications of details of the apparatus.

In reactions which are carried out under pressure and at increased temperature, such as the synthesis of ammonia from its elements, it is preferable, especially to save energy, to try to bring the temperature of the walls sustaining the pressure as near as possible to the temperature of reaction. The strength of all metals, and especially of the steels, diminishes with increasing temperature, so that the limit for heavy loading lies somewhere above 550° C. It has been shown that, in working with hydrogen or hydrogen containing gases under pressure, the vessels gradually lose their mechanical strength and even become useless due to the influence of the hydrogen upon the heated metal. It has also resulted, especially under these circumstances, that the hydrogen leaks or percolates strongly through the wall of the vessel. For instance, an autoclave heated to 500° C. and filled with nitrogen-hydrogen under pressure loses, after a few days, its hydrogen contents almost completely. This hydrogen is naturally lost as an active mass for the reaction, and in the most favorable case, a new compression is necessary for the utilization of this last gas.

I have found that the mentioned disadvantages can be avoided if we proceed in the following manner: For the reaction itself I select an interior reaction vessel which does not necessarily consist of pressure-resisting material, but of material proof against chemical action and leakage or percolation of hydrogen. An exterior metal vessel, capable of bearing the greater pressure is so spaced or separated from the inner vessel that while the greater pressure acts on the wall of the outer metal vessel, no hydrogen comes in contact with it. As the reaction vessel, I use such material as glazed porcelain, glass, quartz and the like; for the outer vessel I prefer metals, especially the various kinds of steel.

The process can be carried out in the following manner, referring to Fig. 1: The inner reaction vessel A is, at a cold part, packed against the outer metal vessel. The pressure pipes $c$, and $a$ leading to the inner chamber $a$ connect the same with the fresh gas pressure vessel C, while the pressure pipe leading to the outer chamber B, on the contrary is first connected by pipe $e'$ with one chamber $E^2$ of an equalizing apparatus E formed into a U shaped body or compartment partly filled with quicksilver $E^3$. The chamber $E^2$ is connected by pipe $e'$ with the space $b$ between the two vessels. The chamber $E'$ of the equalizing apparatus is connected with the filling vessel C, by pipe $e$ and a three way member. The apparatus are either first filled with a gas indifferent to the pressure bearing wall (with nitrogen, for instance, in the case of ammonia synthesis) from the tank (D) to the desired working pressure. Then in the inner reaction chamber only is the nitrogen displaced from C by the hydrogen containing gases. Or we can proceed by simultaneously filling the inner chamber with the hydrogen mixture, the outer with the harmless gas. This simple contrivance is entirely sufficient if there are no strong fluctuations of pressure. Otherwise it is recommended to choose instead of the U-shaped tube of Fig. 1, a casing $E^4$ (Fig. 2) having two chambers ($E^4$ $E^5$) for instance of suitable size and separated by a movable piston $E^6$, or I may use two steel washing bottles $E^{10}$, $E^{11}$ connected at their opposite ends by a pipe $E^{12}$ and each filled with quicksilver. A scale $E^9$, pointer $E^8$ and rod $E^7$ (connected with piston $E^6$) will indicate the difference in pressures of chambers $E^4$ and $E^5$, and consequently between the interior $a$ of the vessel A and the space between the two vessels.

It is obvious that any other form of construction is possible if it answers the purpose of preventing the hydrogen from coming into contact with the hot metal wall. For instance if we have an inner and outer vessel in the simple form shown in the figure, we can fill the outer hot chamber (B) with a suitable composition upon which hydrogen does not act and in which it is not dissolved. In this case the pressure pipes can communicate directly—that is to say, a casing (E or E⁴) may be omitted.

Due to the selected arrangement the hydrogen can no longer exert its injurious influence upon the hot metal wall. The additional result is obtained that even in week long tests of the synthesis of ammonia with the application of temperature of about 500° there was no loss, of hydrogen, even although the partial pressure of same was about 100 atmospheres and the total pressure correspondingly higher.

The process is of special importance for the synthetic production of ammonia from its elements under pressure with the aid of catalytic agents.

What I claim is:

1. In a process of effecting reaction of hydrogen and the like, subjecting the same to pressure within a closed vessel composed of material proof against chemical action by and against leakage therethrough of hydrogen, while simultaneously subjecting the exterior of said vessel to pressure not less than that first mentioned.

2. In a process of effecting reaction of hydrogen and the like, subjecting the same to pressure within a closed and heated vessel composed of material proof against chemical action by and against leakage therethrough of hydrogen, while simultaneously subjecting the exterior of said vessel to pressure.

3. In a process of effecting reaction of hydrogen and the like, subjecting the same to pressure within an inner closed vessel composed of material proof against chemical action by and against leakage therethrough of hydrogen, while simultaneously subjecting the space between the aforesaid vessel and an outer heated vessel to pressure.

4. In a process of effecting reaction of hydrogen and the like under pressure and increased temperature, subjecting the same to pressure within a suitable inner nonmetallic vessel composed of material proof against chemical action by and against leakage therethrough of hydrogen, while simultaneously subjecting the space between that vessel and an outer metallic vessel to pressure, the apparatus being heated during the steps aforesaid.

5. In a process of effecting reaction of hydrogen and the like, subjecting the same to pressure within an inner closed vessel composed of material proof against chemical action by and against leakage therethrough of hydrogen, while simultaneously subjecting the space between the aforesaid vessel and an outer heated vessel to pressure, and utilizing a difference of pressure within the two vessels to equalize the pressures in both.

6. In an apparatus for effecting reaction of hydrogen and the like under pressure, an inner vessel of material proof after long-continued use against chemical action by and against leakage therethrough of hydrogen, an outer and stronger vessel of material liable to be attacked by or to permit leakage therethrough of hydrogen, the vessels being spaced apart, with means for placing both the interior of the inner vessel and the space between both vessels under pressure.

7. In an apparatus for effecting reaction of hydrogen and the like under pressure, an inner vessel of material proof after long-continued use against chemical action by and against leakage therethrough of hydrogen, an outer and stronger vessel of material liable to be attacked by or to permit leakage therethrough of hydrogen, the vessels being spaced apart, with means for placing both the interior of the inner vessel and the space between both vessels under pressure, and with means for equalizing the pressure in the inner vessel and in said space.

In testimony whereof, I have signed my name to this specification in the presence of two subscribing witnesses.

MATHIAS PIER.

Witnesses:
HENRY HASPER,
WOLDEMAR HAUPT.